J. H. MACALPINE.
REVERSIBLE COUPLING.
APPLICATION FILED APR. 19, 1916.

1,293,647.

Patented Feb. 4, 1919.
4 SHEETS—SHEET 1.

INVENTOR.
John H. Macalpine
BY
HIS ATTORNEY IN FACT.

J. H. MACALPINE.
REVERSIBLE COUPLING.
APPLICATION FILED APR. 19, 1916.

1,293,647.

Patented Feb. 4, 1919
4 SHEETS—SHEET 2.

INVENTOR.
John H. Macalpine
BY
HIS ATTORNEY IN FACT

J. H. MACALPINE.
REVERSIBLE COUPLING.
APPLICATION FILED APR. 19, 1916.
1,293,647.
Patented Feb. 4, 1919.
4 SHEETS—SHEET 3.
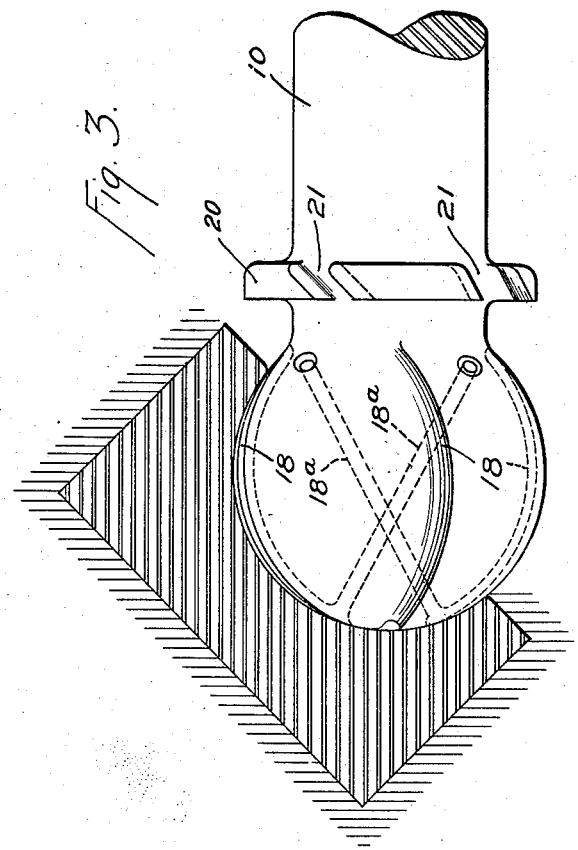
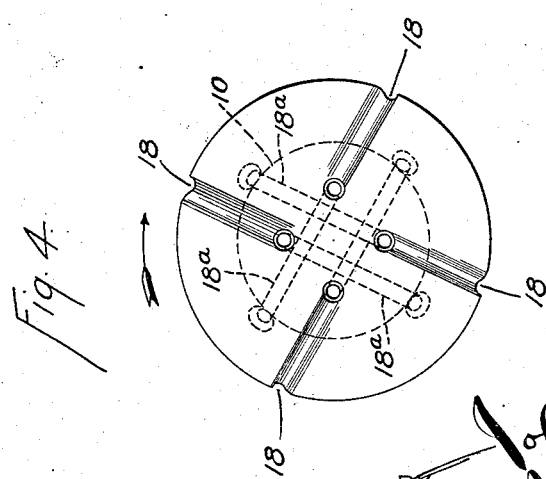
INVENTOR.
John H. Macalpine
BY Jno. Green,
HIS ATTORNEY IN FACT.

J. H. MACALPINE.
REVERSIBLE COUPLING.
APPLICATION FILED APR. 19, 1916.

1,293,647.

Patented Feb. 4, 1919.
4 SHEETS—SHEET 4.

INVENTOR.
John H. Macalpine.
BY
HIS ATTORNEY IN FACT

UNITED STATES PATENT OFFICE.

JOHN H. MACALPINE, OF PITTSBURGH, PENNSYLVANIA, ASSIGNOR TO THE WESTINGHOUSE GEAR & DYNAMOMETER COMPANY, OF EAST PITTSBURGH, PENNSYLVANIA, A CORPORATION OF PENNSYLVANIA.

REVERSIBLE COUPLING.

1,293,647.      Specification of Letters Patent.      Patented Feb. 4, 1919.

Application filed April 19, 1916. Serial No. 92,146.

*To all whom it may concern:*

Be it known that I, JOHN H. MACALPINE, a citizen of the United States, and a resident of Pittsburgh, in the county of Allegheny and State of Pennsylvania, have made a new and useful Invention in Reversible Couplings, of which the following is a specification.

This invention relates to couplings and more particularly to couplings for shafts capable of transmitting relatively large powers.

An object of the invention is to produce a new and improved coupling which is of simple construction and is simpler to assemble and dismantle than other couplings of a similar character now in use and known to me.

An object of the invention is to produce a new and improved coupling, in which means are provided for permitting lateral movement of one member of the coupling, with relation to the other, and for permitting angular motion of the axis of one shaft connected to the coupling relatively to the axis of the other shaft connected to the coupling.

A further object is to produce a relatively light coupling which, for example, may be employed in marine installations and is effective in transmitting power while the power developing apparatus is operated in either direction.

These and other objects, which will be made apparent throughout the further description of the invention, are attained by means of a coupling embodying the features herein described and illustrated.

In the drawings accompanying and forming a part hereof, Figure 1 is a transverse sectional view along the line 1—1 of Fig. 2 and illustrates one embodiment of my invention.

Fig. 3 is a fragmental elevation of a link or strut which forms a detail of my invention, and is shown in connection with a sectional view of a strut pad; the scale of this view is enlarged for convenience of illustration.

Fig. 4 is an end view of the link or strut shown in Fig. 3 and illustrates means which may be employed for lubricating the bearing between the strut and its coöperating pad.

Figure 1:
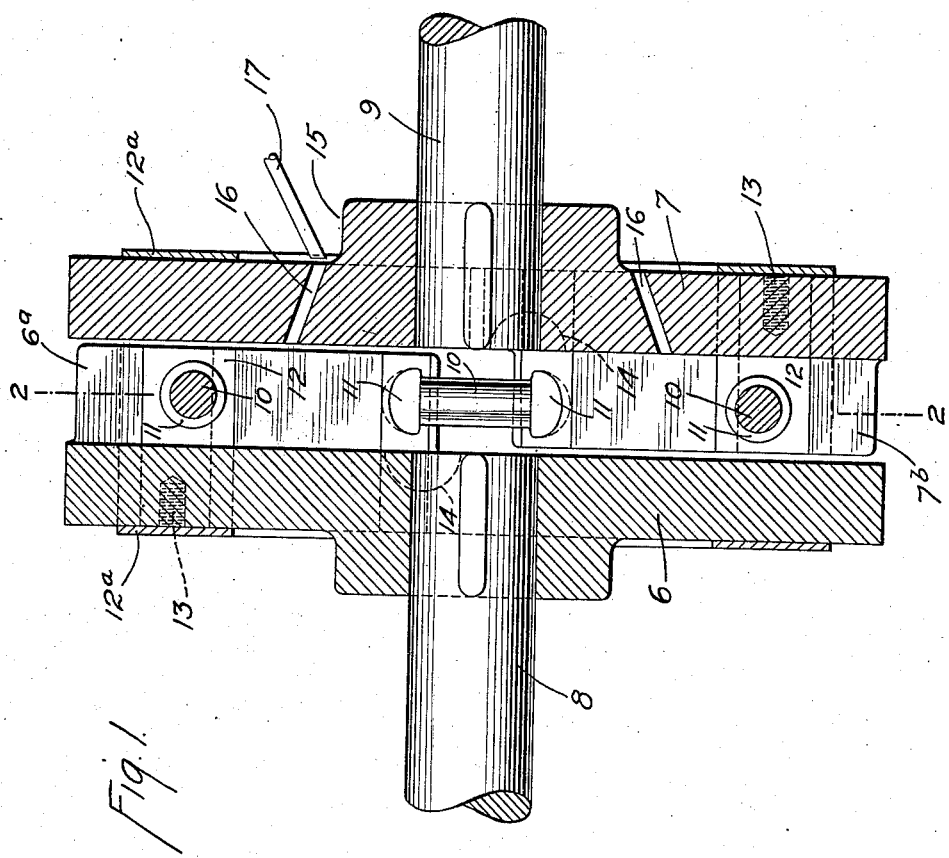

My present invention is particularly adapted to be employed in connection with reduction gearing such as is illustrated in Patent No. 946,455 issued to me and George W. Melville, on January 11, 1910. When so employed one member of the coupling is preferably connected to the flexible shaft of the pinion, forming a part of the gearing, while the other member is connected to the shaft of the driving apparatus. With such an arrangement the coupling is for all practical purposes, a flexible connection between the driving apparatus and the gearing.

As illustrated in Figs. 1 to 4, the coupling includes two coöperating circular members or disks 6 and 7, the one being keyed or otherwise rigidly mounted on a driving shaft 8, and the other being keyed or otherwise rigidly mounted on a driven shaft 9. When the coupling is employed in connection with a reduction gearing the member or disk 7 is mounted on the flexible shaft of the pinion of the gearing. The disk 6 is provided with two laterally projecting lugs 6$^a$ and 6$^b$, which are located diametrically opposite each other and are adapted to coöperate with similar lugs 7$^a$ and 7$^b$, on the disk 7, in engaging power transmitting links or struts 10. The lugs on each disk are located at or near the periphery and when the coupling is assembled the lugs on one disk are located between the lugs on the other disk.

With this arrangement of lugs two sets of struts of two struts each are employed. One set is effective in transmitting power while the coupling is driven in one direction and the other set is effective in transmitting power while the coupling is driven in the reverse direction. The struts located between the lugs 6$^a$ and 7$^a$, and the lugs 6$^b$ and 7$^b$ may, for convenience of description, be termed the ahead set, and the other struts may be termed the reverse set.

As illustrated, each strut 10 is provided with two heads 11, which, as shown, are portions of spheres and are adapted to seat in coöperating recesses formed in pads 12. One of the pads 12, in the case of each strut, is mounted on a lug of the disk 6, while the other is mounted on a lug of the disk 7. Each pad is formed of a metal adapted to provide a suitable bearing for its coöperating strut and is so arranged that it may be drawn transversely, with relation to the disk on which it is mounted, for the purpose of disengaging the strut. As illustrated, each pad is located in a recess, formed within its mounting lug, which extends, in the form of an aperture, through the disk proper. Each pad is of sufficient length to extend the entire length of its mounting recess and aperture, and is shown provided at its outer end with a tapped hole 13, adapted to receive an eyebolt or other suitable drawing tool. Each disk is provided with a retaining ring 12$^a$ for preventing the pads becoming dislodged from their mounting recesses. These rings may be formed in halves to facilitate removing them. Each pad 12 may be tapered toward one end of its mounting lug or each may be provided with a head or any other means to prevent it from moving inwardly through the recess.

In the operation of dismantling the coupling, the retaining rings 12$^a$ are removed; the pads coöperating with one set of struts are then withdrawn, each pad being withdrawn through the aperture formed in its mounting disk. This causes the coöperating struts to be turned about their transverse axes and also frees them from the head engaging recesses formed in the pads.

In couplings formed in accordance with my invention, in which the disks are located relatively close together as compared to the length of the struts, it may be necessary to provide recesses in each disk for receiving the heads of the struts during the operation of withdrawing the pads. In the drawing I have shown two semi-spherical recesses 14 in each disk, each arranged to receive one head of one strut of the reverse set. After the pads have been withdrawn, thus freeing the heads of one set of struts, these struts are removed. One disk of the coupling may then be turned for the purpose of disengaging and removing the struts of the other set. Either set of struts may, of course, be removed by drawing their coöperating pads.

In order that one disk may be removed without the necessity of removing the other disk from its mounting shaft, I so proportion the width or the circumferential length of the lugs on one disk, with respect to the diametric distance between the inner faces of the lugs on the other disk, that the lug on one disk will clear the lug on the other disk when one disk is being lifted out of coöperative relation with the other. In accomplishing this I may turn both disks to such a position that the lugs on the one to be removed are located in a horizontal line, whereas the lugs on the other are located in a vertical line. The former disk can then be lifted out of coöperative relation with the other disk and its lugs will pass free of the upper lug on the remaining disk. The arrangement of the apparatus will determine whether the disk to be removed is moved horizontally or otherwise past the remaining disk. This arrangement is particularly advantageous when one of the disks of the coupling is connected to a turbine shaft and the other is connected to the shaft of a pinion forming a part of the reduction gearing, such as is illustrated in the patent to which I have referred, since the pinion and one disk of the coupling may be readily removed without the necessity of removing either disk from its mounting shaft.

Figure 2:
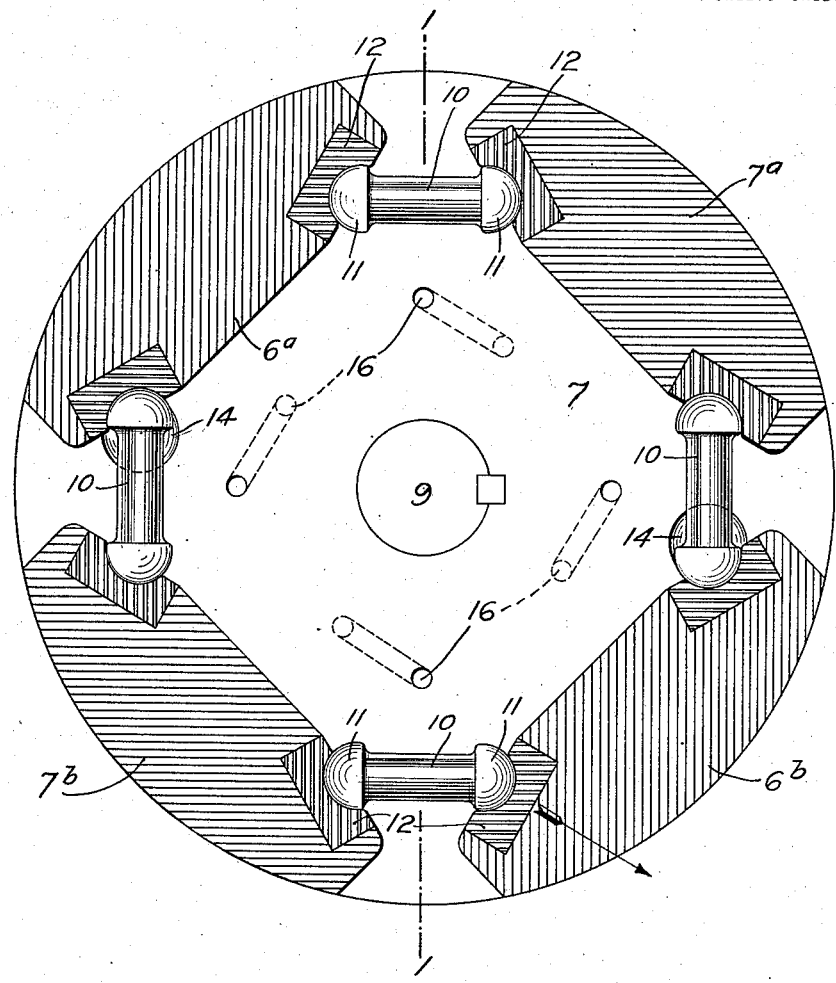
Fig. 2 is a sectional view along the line 2—2 of Fig. 1.

Another feature of the invention is that the position of the struts may be so selected, with relation to the center of rotation of the coupling, that the resultant of the driving force, transmitted by each strut, and of the centrifugal force, at a determined speed and power, occasioned by the rotation of each strut will be normal to the surface of each strut supporting pad, as indicated by the feathered arrow in Fig. 2. With this arrangement the pads can be set at the desired angle so that the struts will be held in place within the head engaging recesses of the pads during the operation of starting.

Another feature of my invention is the lubricating means for delivering lubricant to the bearing surfaces of the struts. As shown in Fig. 1, lubricant is delivered to the annular series of apertures or ducts 16, formed in the disk 7, by means of lubricant delivery pipe 17. As illustrated in Fig. 1, the outer ends of the ducts 16 are adapted to move past the discharge end of the pipe 17 and consequently each receives lubricant from the pipe for an indefinitely short period during each revolution of the disk. These passages are inclined toward the periphery of the disk and consequently centrifugal force aids the delivery of lubricant through them. The lubricant reaches the interior of the coupling in the form of spray and consequently is deposited on all of the moving parts.

Each strut, as shown, is provided in each head with a series of lubricant distributing grooves 18, the inner ends of which are adapted to receive lubricant sprayed from the passages 16 and the outer end of each groove communicates with a passage 18$^a$ extending through the spherical portion of the strut. The centrifugal force acting on the lubricant spray will tend to move the lubricant to a greater radius from the shaft axis; consequently the flow of lubricant will sometimes be from the passages 18 to passages 18$^a$ and sometimes the reverse, depending on the configuration. These passages 18 deliver the lubricant to the bearing face between the pad and the head portion and each is so formed that it will tend to resist a rotary motion of the strut about its longitudinal axis in one direction and to facilitate rotation about this axis and in the direction indicated by the arrow in Fig. 4. The inclination of the grooves 18 will also tend to produce this rotary motion of the struts, when there is any sliding between the spherical bearing surfaces of the struts and pads.

In order to insure an equal distribution of the lubricant over the bearing surface, I have also provided supplementary means on each strut which will tend to cause it to turn about its longitudinal axis as it transmits power. This means, as illustrated in Fig. 3, consists of a collar 20, provided with a series of inclined notches 21. These notches set up an unbalanced component of air pressure on each strut, by reason of the fact that the strut is revolving at high speed about the shaft axis and, inasmuch as there is no force present to counteract this unbalanced air pressure, the struts will turn, as above described, and will consequently maintain a thorough distribution of the lubricant over their bearing surfaces.

In case there is a tendency for the coupling to whistle, due to its high speed of rotation, a laterally extending flange may be provided on the periphery of one of the disks for the purpose of closing the space between the disks. It will, of course, be understood that the entire coupling will be inclosed within a stationary housing or casing provided with a lubricant discharge passage, and that this casing will tend to eliminate the possibility of whistling.

Figure 5:
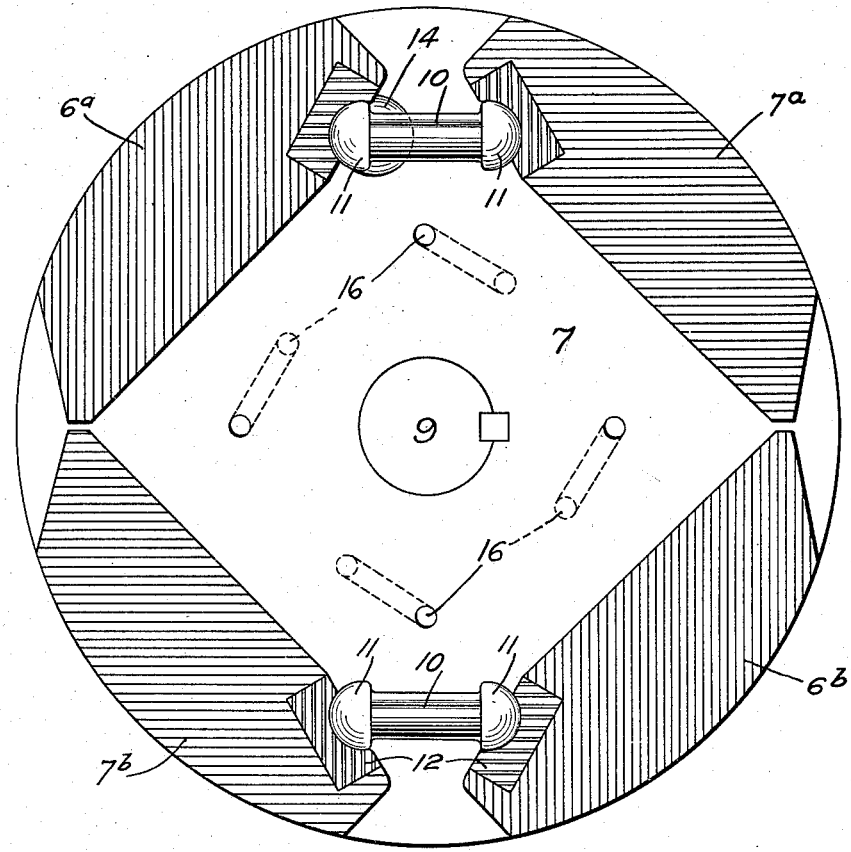
Fig. 5 is a sectional view corresponding to Fig. 2 and illustrates a modification of my invention.

In Fig. 5, I have shown a modified form of coupling in which an ahead set of struts only is employed. The strut mounting lugs are so formed on each disk that they directly coöperate with each other while the coupling is driven in a reverse direction. In order to prevent redundance in the coupling illustrated in Fig. 5 and also in the couplings illustrated in Figs. 1 and 2, it is desirable to have slight circumferential play between the two disks so that the inactive set of struts will rest free in its bearing recesses while the other set is effective in transmitting power. This is shown in Fig. 5, as a clearance space between the lugs 6ª and 7ᵇ and a similar clearance between the lugs 6ᵇ and 7ª. The size of the clearance space is greatly exaggerated for convenience of illustration.

The advantages gained by employing my invention are as follows: First, there is no redundance since the construction is such that each lug of the active set will carry its proportion of the load, when the coupling is employed in connection with a flexible shaft such as described in the patent to which I have referred. Second, there is no hand work necessary on the coupling and it is perfectly balanced. Third, the pinion and the coupling member secured to its flexible shaft, can be readily lifted out of operative relation with the other coupling member without destroying the adjustment of the remaining coupling member or the relative adjustment between the pinion and the coupling member mounted on its flexible shaft. Fourth, the contacts are surface contacts and may readily be made of ample size to transmit the forces encountered. Fifth, the struts being short and relatively light, the centrifugal force may be kept within reasonable limits. Sixth, in marine work the resultant of the driving and the centrifugal forces is in a fixed direction at each contact and the bearing pads can be readily disposed so as to most effectively take care of this reaction. Seventh, the centering of the coupling is accomplished by means of the struts and they also obviate side movement. Eighth, where the coupling is employed in connection with a pinion such as has been referred to, there is perfect freedom of longitudinal movement of the pinion. Ninth, in such an installation in which a flexible shaft is employed, there is a perfect freedom of angular displacement of the axis of the flexible shaft relatively to the axis of the turbine shaft.

Having now described my invention in connection with what I now consider to be the preferred embodiment of it, I desire it to be understood that various changes, substitutions, modifications, additions and omissions may be made in the apparatus illustrated without departing from the spirit and scope of the invention as set forth by the appended claims.

What I claim is:

1. A coupling comprising two members each provided with a set of strut supporting lugs, said lugs being spaced to allow the two members to be laterally disengaged without longitudinal displacement, and a power transmitting strut located between each lug on one member and one of the lugs on the other member.

2. A coupling comprising two members each having apertures formed therein, and each provided with two laterally projecting lugs having laterally extending recesses and so arranged that the lugs of one member coöperate with the lugs of the other member, and a separate bearing pad mounted in the laterally extending recess formed in each lug and projecting through an aperture in the lug supporting member, and having a strut engaging recess formed in said pads; each lug on one of said members being operatively connected to a lug on the other member by one of said struts.

3. A coupling comprising two rotatable members having apertures formed therein, and each provided with two laterally projecting strut supporting lugs, a power transmitting strut extending between each lug on one member and a lug on the other member, and a bearing pad for each strut mounted on each lug and withdrawable laterally through an aperture in the lug supporting member.

4. A coupling comprising two rotatable members having apertures formed therein, and each provided with two laterally projecting lugs, a separate power transmitting strut, having two substantially partially spherical heads, operatively connecting each lug of one member with a lug of the other member, a separate pad mounted on each lug and having a strut receiving recess, each pad being removable through an aperture in its mounting members for the purpose of releasing the struts.

5. A coupling comprising two rotatable members, each provided with two laterally projecting lugs, the lugs of one member being adapted to coöperate with the lugs of the other member in transmitting power, and being so spaced circumferentially with relation to the diametric distance between the lugs on the other member, and of such a length that one member may be lifted free of the other.

6. In combination with a coupling comprising two rotatable members each having laterally projecting lugs adapted to coöperate in transmitting power, a power transmitting strut located between a lug of one member and a lug of the other member and provided with means for causing it to turn on its bearing face while transmitting power.

7. A coupling comprising two rotatable members, each provided with laterally projecting power transmitting lugs, a strut between each two lugs for transmitting the power therebetween, and means for delivering an oil spray into the space between said members and to the struts.

8. A coupling comprising two members, each provided with a set of strut supporting lugs, a strut located between each two lugs, opposite ends of each strut bearing against lugs on opposite members, and a pad at each end of each strut for receiving the thrust thereof, said pads being arranged at right angles to the resultant of the force transmitted by each strut and the centrifugal force thereof under normal operating conditions.

9. A coupling comprising two rotatable members having apertures and recesses formed therein, each provided with two laterally projecting strut supporting lugs, a power transmitting strut extending between each lug on one member and a lug on the other member, and a bearing pad for each strut mounted on each lug and withdrawable laterally through an aperture in the lug supporting member, the said recesses in said lug supporting members being adapted for receiving the end of a strut when the bearing pad is withdrawn through an aperture, so as to allow said strut to be removed.

10. A strut for transmitting power, having spherical ends, oil grooves formed on said ends and passageways through the strut communicating with the outer ends thereof for supplying lubricant thereto.

In testimony whereof, I have hereunto subscribed my name this 17th day of April, 1916.

JOHN H. MACALPINE.

Copies of this patent may be obtained for five cents each, by addressing the "Commissioner of Patents, Washington, D. C."